United States Patent
Demirors et al.

(10) Patent No.: US 11,161,969 B2
(45) Date of Patent: Nov. 2, 2021

(54) ETHYLENE/ALPHA-OLEFIN INTERPOLYMER COMPOSITIONS

(71) Applicant: Dow Global Technologies LLC, Midland, MI (US)

(72) Inventors: Mehmet Demirors, Pearland, TX (US); Brayden E. Glad, Angleton, TX (US); Rongjuan Cong, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 160 days.

(21) Appl. No.: 16/469,773

(22) PCT Filed: Dec. 6, 2017

(86) PCT No.: PCT/US2017/064826
§ 371 (c)(1),
(2) Date: Jun. 14, 2019

(87) PCT Pub. No.: WO2018/111638
PCT Pub. Date: Jun. 21, 2018

(65) Prior Publication Data
US 2019/0359807 A1 Nov. 28, 2019

Related U.S. Application Data

(60) Provisional application No. 62/435,336, filed on Dec. 16, 2016.

(51) Int. Cl.
*C08F 210/16* (2006.01)
*C08L 23/08* (2006.01)
*C08J 5/18* (2006.01)

(52) U.S. Cl.
CPC ........ *C08L 23/0815* (2013.01); *C08F 210/16* (2013.01); *C08J 5/18* (2013.01); *C08J 2323/08* (2013.01); *C08J 2423/08* (2013.01); *C08L 2203/16* (2013.01); *C08L 2205/02* (2013.01)

(58) Field of Classification Search
CPC .................................................. C08F 210/16
See application file for complete search history.

(56) References Cited

U.S. PATENT DOCUMENTS

| | | | |
|---|---|---|---|
| 6,683,149 B2 | 1/2004 | Jain et al. | |
| 6,812,289 B2 | 11/2004 | Van Dun et al. | |
| 6,908,968 B2 | 6/2005 | Jain et al. | |
| 6,998,440 B2 | 2/2006 | Alarcon et al. | |
| 7,601,409 B2 | 10/2009 | Ohlsson | |
| 7,951,873 B2 | 5/2011 | Best et al. | |
| 8,722,804 B2 | 5/2014 | Lue et al. | |
| 9,828,476 B2 * | 11/2017 | Bensason | B32B 27/205 |
| 10,150,275 B2 * | 12/2018 | Shah | B32B 27/06 |
| 2011/0015346 A1 † | 1/2011 | Hermel-Davidock | |
| 2013/0046061 A1 † | 2/2013 | Hermel-Davidock | |
| 2013/0150537 A1 † | 6/2013 | Hermel-Davidock | |
| 2014/0248816 A1 * | 9/2014 | Bonavoglia | D04H 1/4291 442/361 |
| 2015/0225520 A1 * | 8/2015 | Bensason | C08F 210/16 526/348.1 |

FOREIGN PATENT DOCUMENTS

| | | |
|---|---|---|
| WO | 2007130277 | 11/2007 |
| WO | 2013056466 | 4/2013 |
| WO | 2014012250 | 1/2014 |
| WO | 2014058659 | 4/2014 |
| WO | 2015119845 | 8/2015 |

OTHER PUBLICATIONS

International Search Report & Written Opinion for related PCT Application PCT/US2017/064826, dated Mar. 7, 2018 (12 pgs).
International Preliminary Report on Patentability for related PCT Application PCT/US2017/064826, dated Jun. 27, 2019 (7 pgs).

* cited by examiner
† cited by third party

*Primary Examiner* — Rip A Lee
(74) *Attorney, Agent, or Firm* — Brooks, Cameron & Huebsch, PLLC

(57) ABSTRACT

Embodiments of the present disclosure are directed ethylene/alpha-olefin interpolymer compositions including a polyethylene and an alpha-olefin comonomer, where the polyethylene is from 70 wt % to 100 wt % of the interpolymer composition based on a total weight of the interpolymer composition and the interpolymer composition is characterized by a Comonomer Distribution Constant (CDC) in a range of from 100 to 500, a vinyl unsaturation of less than 0.15 vinyls per one thousand total carbon atoms present in the interpolymer composition, a zero shear viscosity ratio (ZSVR) in a range from 1.5 to 5, a density in a range of from 0.903 to 0.950 g/cm$^3$, a melt index ($I_2$) in a range of from 0.1 to 15 g/10 minutes, a molecular weight distribution ($M_w/M_n$) in a range of from 1.8 to 4.5, and a separation index of from 0.50 to 1.10.

7 Claims, No Drawings

ETHYLENE/ALPHA-OLEFIN INTERPOLYMER COMPOSITIONS

This application is a National Stage Application under 35 U.S.C. § 371 of International Application Number PCT/US2017/064826, filed Dec. 6, 2017 and published as WO 2018/111638 A1 on Jun. 21, 2018, which claims the benefit to U.S. Provisional Application 62/435,336, filed Dec. 16, 2016, the entire contents of which are incorporated herein by reference in its entirety.

FIELD OF DISCLOSURE

Embodiments of the present disclosure are directed ethylene/alpha-olefin interpolymer compositions, more specifically, embodiments are directed towards ethylene/alpha-olefin interpolymer compositions having a separation index of from 0.50 to 1.10.

BACKGROUND

Polymers may be utilized for a number of articles including films, among others. Polymers can be formed by reacting one or more types of monomer in a polymerization reaction. There is continued focus in the industry on developing new and improved materials and/or methods that may be utilized to form polymers having one or more desirable properties.

SUMMARY

The present disclosure provides ethylene/alpha-olefin interpolymer compositions including a polyethylene and an alpha-olefin comonomer, wherein the polyethylene is from 70 wt % to 100 wt % of the interpolymer composition based on a total weight of the interpolymer composition and the interpolymer composition is characterized by a Comonomer Distribution Constant (CDC) in a range of from 100 to 500, a vinyl unsaturation of less than 0.15 vinyls per one thousand total carbon atoms present in the interpolymer composition, a zero shear viscosity ratio (ZSVR) in a range from 1.5 to 5, a density in a range of from 0.903 to 0.950 g/cm$^3$, a melt index ($I_2$) in a range of from 0.1 to 15 g/10 minutes, a molecular weight distribution ($M_w/M$) in a range of from 1.8 to 4.5, and a separation index of from 0.50 to 1.10.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Ethylene/alpha-olefin interpolymer compositions are described herein. As an example, an ethylene/alpha-olefin interpolymer composition may include a polyethylene; and an alpha-olefin comonomer, wherein the polyethylene is from 70 wt % to 100 wt % of the interpolymer composition based on a total weight of the interpolymer composition and the interpolymer composition is characterized by a Comonomer Distribution Constant (CDC) in a range of from 100 to 500, a vinyl unsaturation of less than 0.15 vinyls per one thousand total carbon atoms present in the interpolymer composition, a zero shear viscosity ratio (ZSVR) in a range from 1.5 to 5, a density in a range of from 0.903 to 0.950 g/cm$^3$, a melt index ($I_2$) in a range of from 0.1 to 15 g/10 minutes, a molecular weight distribution ($M_w/M$) in a range of from 1.8 to 4.5, and a separation index of from 0.50 to 1.10.

Providing a separation index of from 0.50 to 1.10 can help to provide advantageous properties for products formed form the ethylene/alpha-olefin interpolymer compositions, among other benefits. For instance, films formed from the ethylene/alpha-olefin interpolymer compositions disclosed herein may advantageously have an improved, e.g., greater, ultimate stretch, as compared to films made from other compositions.

As mentioned, ethylene/alpha-olefin interpolymer compositions are described herein. As used herein, "composition," as used herein, refers to a mixture of materials which comprise the composition, as well as reaction products and decomposition products formed from the materials of the composition. As used herein, "polymer," as used herein, refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined, below. The terms "ethylene/alpha-olefin polymer" is indicative of interpolymers as described. As used herein, "interpolymer" refers to polymers prepared by the polymerization of at least two different types of monomers. The generic term interpolymer includes copolymers, usually employed to refer to polymers prepared from two different monomers, and polymers prepared from more than two different types of monomers. As used herein, "ethylene/alpha-olefin interpolymer" refers to an interpolymer that contains more than 50 mole percent polymerized ethylene monomer based on the total amount of polymerizable monomers and at least one alpha-olefin.

The ethylene/alpha-olefin interpolymer compositions include a polyethylene. The interpolymer compositions may include from 70 wt % to 100 w % of the polyethylene, based on a total weight of the interpolymer composition. All individual values and subranges from 70 wt % to 100 w % are included; for example, interpolymer compositions may include the polyethylene from a lower limit of 70, 75, 80, 85, or 90 wt % to an upper limit of 100, 99, 98, 97, 96, or 95 w % based on a total weight of the interpolymer composition. In other words, the interpolymer compositions may include less than or equal to 100 wt % of units derived from ethylene, or at least 70 wt %, or at least 80 wt %, or at least 90 wt % of units derived from ethylene, based upon the total weight of the interpolymer composition.

The interpolymer compositions include an alpha-olefin comonomer. The alpha-olefin comonomer may have 20 or fewer carbon atoms. For example, one or more embodiments of the present disclosure provides that the alpha-olefin comonomer may have 3 to 10 carbon atoms. One or more embodiments of the present disclosure provides that the alpha-olefin comonomer may have 3 to 8 carbon atoms. Examples of the alpha-olefin comonomer include, but are not limited to, propylene, 1-butene, 1-pentene, 1-hexene, 1-heptene, 1-octene, 1-nonene, 1-decene, and 4-methyl-1-pentene, and combinations thereof. The one or more of the alpha-olefin comonomers may, for example, be selected from propylene, 1-butene, 1-hexene, and 1-octene; or in the alternative, from of 1-hexene and 1-octene, for instance.

The ethylene/alpha-olefin interpolymer compositions may be formed by a number of ethylene (co)polymerization reaction processes, e.g., conventional ethylene (co)polymerization reaction processes. Such ethylene (co)polymerization reaction processes include, but are not limited to, slurry phase polymerization process, solution phase polymerization process, and combinations thereof. The ethylene/alpha-olefin interpolymer compositions may be formed by utilizing a number of reactors, e.g. loop reactors, stirred tank reactors, batch reactors in parallel, series, and combinations thereof, for instance. The ethylene/alpha-olefin interpolymer compositions may be formed by any polymerization method and procedure known in the art, including solution, slurry, or gas phase polymerization processes provided the operations, reactor configurations, catalysis systems and the like are selected, employed and carried out to indeed provide the ethylene/alpha-olefin interpolymer compositions disclosed herein, with combination of characteristics described herein.

As an example, an ethylene/alpha-olefin interpolymer composition as disclosed herein may be formed by a process including the steps of: polymerizing ethylene and optionally one or more alpha-olefins in the presence of a first catalyst to form a semi-crystalline polymer in a first reactor or a first part of a multi-part reactor; and reacting freshly supplied ethylene and optionally one or more alpha-olefins in the presence of a second catalyst comprising an organometallic catalyst thereby forming the ethylene/alpha-olefin interpolymer composition in at least one other reactor or a later part of a multi-part reactor, wherein at least one of the catalyst systems in one of the steps includes a metal complex of a polyvalent aryloxyether corresponding to the formula:

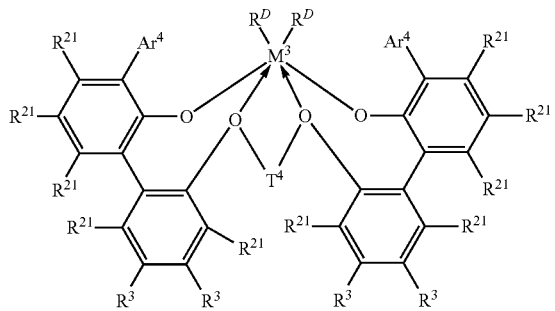

wherein $M^3$ is Ti, Hf, or Zr; each $Ar^4$ is independently a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached; each $T^4$ is a $C_{2-20}$ alkylene, cycloalkylene or cycloalkenylene group, or an inertly substituted derivative thereof; each $R^{21}$ is independently hydrogen, halo, hydrocarbyl, trihydrocarbylsilyl, trihydrocarbylsilylhydrocarbyl, alkoxy or di(hydrocarbyl)amino group of up to 50 atoms not counting hydrogen; each $R^3$ is independently hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and each $R^D$ is independently halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

One or more embodiments of the present disclosure provides that $M^3$ is Zr.

Suitable procatalysts, catalysts, and/or co-catalysts include [[2,2'''-[1,3-propanediylbis(oxy-k-O)]bis[3'',5,5''-tris(1,1-dimethylethyl)-5'-methyl[1,1':3',1''-terphenyl]-2'-olato-k-O]](2-)]-zirconium dimethyl; bis(hydrogenated tallow alkyl)methyl, tetrakis(pentafluorophenyl)borate(1-) amine; and/or modified methyl aluminoxane; and combinations thereof, among others. For various applications, procatalysts, catalysts, and/or co-catalysts may be utilized alone and/or in combination with one another. As used herein, procatalysts, catalysts, and co-catalysts may each be referred to as catalyst components.

As mentioned, the ethylene/alpha-olefin interpolymer compositions disclosed herein can have a comonomer distribution constant (CDC) from 100 to 500. All individual values and subranges from 100 to 500 are included; for example, the ethylene/alpha-olefin interpolymer compositions can have a CDC from a lower limit of 100, 120, 140, 160, 180, or 200 to an upper limit of 500, 480, 460, 440, 420, or 400. One or more embodiments of the present disclosure provides that the ethylene/alpha-olefin interpolymer compositions can have a CDC from 200 to 400.

The ethylene/alpha-olefin interpolymer compositions disclosed herein can have a vinyl unsaturation of less than 0.15 vinyls per one thousand total carbon atoms present in the ethylene/alpha-olefin interpolymer composition. For instance, the ethylene/alpha-olefin interpolymer compositions can have a vinyl unsaturation from a lower level of 0.01 or 0.02 to an upper limit of 0.15, 0.13, 0.10, 0.09, or 0.08 vinyls per one thousand total carbon atoms present in the ethylene/alpha-olefin interpolymer composition. Unsaturations can include those indicated in U.S. Pat. No. 8,372,931, which is incorporated by reference.

The ethylene/alpha-olefin interpolymer compositions disclosed herein can have a zero shear viscosity ratio (ZSVR) from 1.5 to 5.0. All individual values and subranges from 1.5 to 5.0 are included; for example, the ethylene/alpha-olefin interpolymer compositions can have a ZSVR from a lower limit of 1.5, 1.7, or 1.8 to an upper limit of 5.0, 4.8, or 4.6.

The ethylene/alpha-olefin interpolymer compositions disclosed herein can have a density from 0.903 to 0.950 g/cm³. All individual values and subranges from 0.903 to 0.950 g/cm³ are included; for example, the ethylene/alpha-olefin interpolymer compositions can have a density from a lower limit of 0.903, 0.905, 0.907, or 0.909 g/cm³ to an upper limit of 0.950, 0.945, 0.940, 0.935, 0.930, or 0.925 g/cm³.

The ethylene/alpha-olefin interpolymer compositions disclosed herein can have a melt index ($I_2$) from 0.1 to 15.0 g/10 minutes. All individual values and subranges from 0.1 to 15 g/10 minutes are included; for example, the ethylene/alpha-olefin interpolymer compositions can have a melt index ($I_2$) from a lower limit of 0.1, 0.3, 0.5 or 1.0 g/10 minutes to an upper limit of 15.0, 14.0, 13.0, 12.0, 11.0 or 10.0 g/10 minutes.

The ethylene/alpha-olefin interpolymer compositions disclosed herein can have a molecular weight distribution ($M_w/M$) from 1.8 to 4.5. All individual values and subranges from 1.8 to 4.5 are included; for example, the ethylene/alpha-olefin interpolymer compositions can have a molecular weight distribution ($M_w/M$) from a lower limit of 1.8, 1.9, or 2.0 to an upper limit of 4.5, 4.4, or 4.35.

The ethylene/alpha-olefin interpolymer compositions disclosed herein can have a separation index of from 0.50 to 1.10. All individual values and subranges from 0.50 to 1.10 are included; for example, the ethylene/alpha-olefin interpolymer compositions can have a separation index of from a lower limit of 0.50, 0.55, 0.60, or 0.70 to an upper limit of 1.10, 1.09, 1.08, 1.07, 1.06, or 1.05.

One or more embodiments of the present disclosure provides that the ethylene/alpha-olefin interpolymer compositions may include a processing aid, e.g., a plasticizer. Examples of processing aids include, but are not limited to, phthalates, such as dioctyl phthalate and diisobutyl phthalate, natural oils such as lanolin, and paraffin, naphthenic and aromatic oils obtained from petroleum refining, and liquid resins from rosin or petroleum feedstocks among others. Different amounts of the processing aid may be utilized for various applications.

One or more embodiments of the present disclosure provides that the ethylene/alpha-olefin interpolymer compositions may include an additive and/or an adjuvant. Examples of additives and/or an adjuvants include, but are not limited to, fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth, tackifiers, oil extenders, including paraffinic or napthenic oils, and other natural and synthetic polymers. One or more embodiments of the present disclosure provides that the additive and/or the adjuvant may be added post-formation of the ethylene/alpha-olefin interpolymer composition. Different amounts of the additive and/or the adjuvant may be utilized for various applications.

The ethylene/alpha-olefin interpolymer compositions may be blended with other polyolefins. Suitable polymers for blending with the ethylene/alpha-olefin interpolymer compositions disclosed herein include thermoplastic and non-thermoplastic polymers including natural and synthetic polymers. Examples of polymers for blending include polypropylene, such as impact modifying polypropylene, isotactic polypropylene, atactic polypropylene, and random ethylene/propylene copolymers, various types of polyethylene, including high pressure, free-radical LDPE, Ziegler-Natta LLDPE, metallocene PE, including multiple reactor PE, e.g., "in reactor" blends of Ziegler-Natta PE and metallocene PE, such as products disclosed in U.S. Pat. Nos. 6,545,088; 6,538,070; 6,566,446; 5,844,045; 5,869,575; and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Herein, all applications, publications, patents, test procedures, and other documents cited, are fully incorporated by reference to the extent such disclosure is not inconsistent with the disclosed compositions and methods and for all jurisdictions in which such incorporation is permitted. Homogeneous polymers such as olefin plastomers and elastomers, ethylene and propylene-based copolymers, e.g., polymers available under the trade designation VERSIFY™ Plastomers & Elastomers (The Dow Chemical Company), SURPASS™ (Nova Chemicals), and VISTAMAXX™ (ExxonMobil Chemical Co.) can also be useful as components in blends comprising the ethylene/alpha-olefin interpolymer compositions disclosed herein. Different amounts of the other polyolefins may be utilized for various applications.

The ethylene/alpha-olefin interpolymer compositions disclosed herein may be utilized for a number of various applications, e.g., forming a number of articles. For example, the ethylene/alpha-olefin interpolymer compositions may be utilized to form films, e.g., monolayer films and multilayer films. The films may be prepared by cast, blown, calendared, and/or extrusion coating processes. The ethylene/alpha-olefin interpolymer compositions may be utilized to form molded articles, such as blow molded, injection molded, or rotomolded articles. The ethylene/alpha-olefin interpolymer compositions may be utilized to form extrusions, fibers, and woven or non-woven fabrics. The ethylene/alpha-olefin interpolymer compositions may be utilized in other compositions, e.g., thermoplastic compositions including blends with other natural or synthetic materials, polymers, additives, reinforcing agents, ignition resistant additives, antioxidants, stabilizers, colorants, extenders, crosslinkers, blowing agents, and/or plasticizers.

As mentioned, an article formed from the ethylene/alpha-olefin interpolymer compositions disclosed herein may have a number of advantageous properties. For instance, a film, e.g., a monolayer film, with a thickness of approximately 0.8 mil formed from the ethylene/alpha-olefin interpolymer compositions disclosed herein may have an ultimate stretch value greater than 345% or greater than 350%. The film may have an ultimate stretch value from a lower limit of 345%, or 350% to an upper limit of greater than 400%, e.g., 450%, 425%, 410%, or 405%.

A film, e.g., a monolayer film, with a thickness of approximately 0.8 mil formed from the ethylene/alpha-olefin interpolymer compositions disclosed herein may have an on-pallet puncture value from a lower limit of 8.5, 9.0, or 9.2 lbf to an upper limit of 16.0, 15.5, or 15.0 lbf.

A film, e.g., a monolayer film, with a thickness of approximately 0.8 mil formed from the ethylene/alpha-olefin interpolymer compositions disclosed herein may have an on-pallet tear value from a lower limit of 10.5, 11.0, or 11.3 lbf to an upper limit of 17.0, 16.5, or 16.0.

A film, e.g., a monolayer film, with a thickness of approximately 0.6 mil formed from the ethylene/alpha-olefin interpolymer compositions disclosed herein may have an ultimate stretch greater than 295%. The film may have an ultimate stretch from a lower limit of 295%, or 296% to an upper limit of 400%, 395%, 390%, or 380%.

A film, e.g., a monolayer film, with a thickness of approximately 0.6 mil formed from the ethylene/alpha-olefin interpolymer compositions disclosed herein may have an on-pallet puncture value from a lower limit of 6.0, 6.5, or 7.0 lbf to an upper limit of 14.0, 13.5, or 13.0 lbf.

A film, e.g., a monolayer film, with a thickness of approximately 0.6 mil formed from the ethylene/alpha-olefin interpolymer compositions disclosed herein may have an on-pallet tear value from a lower limit of 6.0, 6.5, 7.0, 7.5 or 8.0 lbf to an upper limit of 14.0, 13.5, 13.0, 12.5, 12.0, or 11.5.

EXAMPLES

In the Examples, various terms and designations for materials are used including, for instance, the following: ELITE AT 6111 (utilized as Comparative Example A; ethylene/octene copolymer; available from The Dow Chemical Company); ELITE 5230G (utilized as Comparative Example B; ethylene/octene copolymer; available from The Dow Chemical Company).

Examples 1-3, ethylene/alpha-olefin interpolymer compositions, were prepared as follows.

All raw materials (monomer and comonomer) and the process solvent (a narrow boiling range high-purity isoparaffinic solvent, Isopar-E) were purified with molecular sieves before introduction into the reaction environment. Hydrogen was supplied pressurized as a high purity grade and was not further purified. The reactor monomer feed stream was pressurized via a mechanical compressor to above reaction pressure. The solvent and comonomer feed was pressurized via a pump to above reaction pressure. The individual catalyst components were manually batch diluted to specified component concentrations with purified solvent and pressured to above reaction pressure. All reaction feed flows were measured with mass flow meters and independently controlled with computer automated valve control systems.

The dual reactor system was run in a series configuration. Each continuous solution polymerization reactor consisted of a liquid full, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to the reactor (solvent, monomer, comonomer, and hydrogen) was temperature controlled by passing the feed stream through a heat exchanger. The total fresh feed to the polymerization reactor was injected into the reactor at two locations with approximately equal reactor volumes between each injection location. The fresh feed was controlled with each injector receiving half of the total fresh feed mass flow. The catalyst components were injected into the polymerization reactor through injection stingers. The primary catalyst component feed was controlled to maintain the reactor monomer conversion at the specified target. The co-catalyst components were fed based on calculated specified molar ratios to the primary catalyst component. Immediately following each reactor feed injection location, the feed streams were mixed with the circulating polymerization reactor contents with static mixing elements. The contents of the reactor were continuously circulated through heat exchangers responsible for removing much of the heat of reaction and with the temperature of the coolant side responsible for maintaining an isothermal reaction environment at the specified temperature. Circulation around the reactor loop was provided by a pump.

The effluent from the first polymerization reactor (containing solvent, monomer, comonomer, hydrogen, catalyst components, and polymer) exited the first reactor loop and was added to the second reactor loop.

The final reactor effluent from the second polymerization reactor entered a zone where it was deactivated with the addition of and reaction with a suitable reagent (water). At this same reactor exit location other additives were added for polymer stabilization.

Following catalyst deactivation and additive addition, the reactor effluent entered a devolatization system where the polymer was removed from the non-polymer stream. The isolated polymer melt was pelletized and collected. The non-polymer stream passed through various pieces of equipment that separate most of the ethylene, which was removed from the system. Most of the solvent and unreacted comonomer was recycled back to the reactor after passing through a purification system. A small amount of solvent and comonomer was purged from the process. Catalyst component 2 is modified methyl aluminoxane; Catalyst component 1 is bis(hydrogenated tallow alkyl)methyl, tetrakis(pentafluorophenyl)borate(1-)amine; Catalyst component 3 is [[2,2'''-[1,3-propanediylbis(oxy-k-O)]bis[3'',5,5''-tris(1,1-dimethylethyl)-5'-methyl[1,1':3',1''-terphenyl]-2'-olato-k-O]](2-)]-zirconium dimethyl.

The process conditions are reported in Table 1.

TABLE 1

| | Units | Example 1 | Example 2 | Example 3 |
|---|---|---|---|---|
| Reactor Configuration | | Dual Series | Dual Series | Dual Series |
| Comonomer type | | 1-octene | 1-octene | 1-octene |
| First Reactor Feed Solvent/Ethylene Mass Flow Ratio | g/g | 4.5 | 4.5 | 4.7 |
| First Reactor Feed Comonomer/Ethylene Mass Flow Ratio | g/g | 0.36 | 0.20 | 0.28 |
| First Reactor Feed Hydrogen/Ethylene Mass Flow Ratio | g/g | 2.5E−04 | 5.4E−04 | 4.5E−04 |
| First Reactor Temperature | °C. | 150 | 150 | 150 |
| First Reactor Pressure | barg | 50 | 50 | 50 |
| First Reactor Ethylene Conversion | % | 93.1 | 72.1 | 75.0 |
| First Reactor Catalyst Component | Type | Catalyst component 3 | Catalyst component 3 | Catalyst component 3 |
| First Reactor Catalyst Component | Type | Catalyst component 1 | Catalyst component 1 | Catalyst component 1 |
| First Reactor Catalyst Component | Type | Catalyst component 2 | Catalyst component 2 | Catalyst component 2 |
| First Reactor Catalyst Component 1 to Catalyst Component 3 Molar Ratio (B to Zr ratio) | Ratio | 1.2 | 1.2 | 1.9 |
| First Reactor Catalyst Component 2 to Catalyst Component 3 Molar Ratio (Al to Zr ratio) | Ratio | 20.0 | 20.0 | 30 |
| First Reactor Residence Time | min | 26 | 23 | 7.6 |
| Second Reactor Feed Solvent/Ethylene Mass Flow Ratio | g/g | 3.7 | 6.2 | 2.1 |
| Second Reactor Feed Comonomer/Ethylene Mass Flow Ratio | g/g | 0.093 | 0.648 | 0.527 |
| Second Reactor Feed Hydrogen/Ethylene Mass Flow Ratio | g/g | 9.8E−04 | 8.8E−05 | 6.5E−04 |
| Second Reactor Temperature | °C. | 190 | 190 | 190 |
| Second Reactor Pressure | barg | 50 | 50 | 50 |
| Second Reactor Ethylene Conversion | % | 56.0 | 84.0 | 89.7 |
| First Reactor Catalyst Component | Type | Catalyst component 3 | Catalyst component 3 | Catalyst component 3 |
| First Reactor Catalyst Component | Type | Catalyst component 1 | Catalyst component 1 | Catalyst component 1 |
| First Reactor Catalyst Component | Type | Catalyst component 2 | Catalyst component 2 | Catalyst component 2 |

TABLE 1-continued

|  | Units | Example 1 | Example 2 | Example 3 |
|---|---|---|---|---|
| First Reactor Catalyst Component 1 to Catalyst Component 3 Molar Ratio (B to Zr ratio) | mol/mol | 1.2 | 1.2 | 1.2 |
| First Reactor Catalyst Component 2 to Catalyst Component 3 Molar Ratio (Al to Zr ratio) | mol/mol | 15.0 | 15.0 | 15.0 |
| Second Reactor Residence Time | min | 15 | 12 | 5.7 |

Examples 1-3 and Comparative Examples A-B were tested for various properties according to the test methods described herein, and the properties are reported in Table 2.

Density was determined by preparing samples for density measurement according to ASTM D 1928 and making measurements within one hour of sample pressing using ASTM D792, Method B (isopropanol).

Melt index ($I_2$) was measured in accordance with ASTM D 1238, Condition 190° C./2.16 kg.

Vinyl unsaturation was determined by utilizing $^1$H nuclear magnetic resonance ($^1$H NMR) spectroscopy. A stock solution (3.26 g) was added to 0.133 g to a respective sample (0.133 g) of Examples 1-3 and Comparative Examples A-C in 10 mm NMR tube. The stock solution was a mixture of tetrachloroethane-$d_2$ (TCE) and perchloroethylene (50:50, w:w) with 0.001M $Cr^{3+}$. The solution in the tube was purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

For zero-shear viscosity ratio (ZSVR), zero-shear viscosities were obtained via creep tests that were conducted on an AR-G2 stress controlled rheometer (TA Instruments; New Castle, Del.) using 25-mm-diameter parallel plates at 190° C. The rheometer oven was set to test temperature for at least 30 minutes prior to zeroing fixtures. At the testing temperature a compression molded sample disk was inserted between the plates and allowed to come to equilibrium for 5 minutes. The upper plate was then lowered down to 50 μm above the desired testing gap (1.5 mm). Any superfluous material was trimmed off and the upper plate was lowered to the desired gap. Measurements were done under nitrogen purging at a flow rate of 5 L/min. Default creep time was set for 2 hours. A constant low shear stress of 20 Pa was applied for all of the samples to ensure that the steady state shear rate was low enough to be in the Newtonian region. The resulting steady state shear rates were in the range of $10^{-3}$ to $10^{-4}$ $s^{-1}$ for the samples. Steady state was determined by taking a linear regression for all the data in the last 10% time window of the plot of log (J(t)) vs. log(t), where J(t) is creep compliance and t is creep time. If the slope of the linear regression was greater than 0.97, steady state is considered to be reached, then the creep test was stopped. In all cases, the slope met the criterion within 2 hours. The steady state shear rate was determined from the slope of the linear regression of all of the data points in the last 10% time window of the plot of c vs. t, where c is strain. The zero-shear viscosity was determined from the ratio of the applied stress to the steady state shear rate. To determine if the sample was degraded during the creep test, a small amplitude oscillatory shear test was conducted before and after the creep test on the same specimen from 0.1 to 100 rad/s. The complex viscosity values of the two tests were compared. If the difference of the viscosity values at 0.1 rad/s was greater than 5%, the sample is considered to have degraded during the creep test, and the result was discarded.

Zero-shear viscosity ratio (ZSVR) is defined as the ratio of the zero-shear viscosity (ZSV) of the branched polyethylene material to the ZSV of the linear polyethylene material at the ethylene equivalent weight average molecular weight (Mw-gpc) as shown in the following formula:

$$ZSVR = \frac{\eta_{0B}}{\eta_{0L}} = \frac{\eta_{0B}}{2.29 \times 10^{-15} M_{w-gpc}^{3.65}}$$

The ZSV value was obtained from creep test at 190° C. via the method described above. The Mw-gpc value was determined by the conventional GPC method. The correlation between ZSV of linear polyethylene and its Mw-gpc was established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

The $^1$H NMR were run with a 10 mm cryoprobe at 120° C. on Bruker AVANCE 400 MHz spectrometer. Two experiments were run to get the unsaturation: the control and the double presaturation experiments. For the control experiment, the data was processed with exponential window function with LB=1 Hz, baseline was corrected from 7 to −2 ppm. The signal from residual $^1$H of TCE is set to 100, the integral $T_{total}$ from −0.5 to 3 ppm was used as the signal from whole polymer in the control experiment. The number of $CH_2$ group, $NCH_2$, in the polymer was calculated as following:

$$NCH_2 = I_{total}/2$$

For the double presaturation experiment, the data was processed with exponential window function with LB=1 Hz, baseline was corrected from 6.6 to 4.5 ppm. The signal from residual $_1$H of TCE was set to 100, the corresponding integrals for unsaturations ($I_{vinylene}$, $I_{trisubstituted}$, and $I_{vinyl}$ and $I_{vinylidene}$) were integrated based on a region as shown in FIG. 20 of U.S. Pat. No. 8,372,931.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons was calculated as following:

$$N_{vinylene}/1,000,000C=(N_{vinylene}/NCH_2)*1,000,000$$

$$N_{trisubstituted}/1,000,000C=(N_{trisubstituted}/NCH_2)*1,000,000$$

$$N_{vinyl}/1,000,000C=(N.sub.vinyl/NCH_2)*1,000,000$$

$$N_{vinylidene}/1,000,000C=(N.sub.vinylidene/NCH_2)*1,000,000$$

Vinyl unsaturation per 1,000 total C atoms is equal to $(N_{vinyl}/1,000,000 \text{ C})*1000$. The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation was defined as signal to noise ratio of 10. The chemical shift reference was set at 6.0 ppm for the $^1H$ signal from residual proton from TCT-d2. The control was run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are as follows:

lclprfz_zz
    prosol relations=<lcnmr>
    #include <Avance.incl>
    "d12=20u"
    "d11=iu"
    1 ze
    d12 pl21:f2
    2 30m
    d13
    d12 p19:f1
    d1 cw:f1 ph29 cw:f2 ph29
    d11 do:f1 do:f2
    d12p1):f1
    p1 ph1
    go=2 ph31
    30m mc #0 to 2 F0(zd)
    exit
    ph1=0 2 2 6 1 3 3 1
    ph29=0
    ph31=0 2 2 0 1 3 3 1

The chromatographic system consists of either a Polymer Laboratories Model PL-210 (Agilent) or a Polymer Laboratories Model PL-220 (Agilent) or PolymerChar HT GPC (Spain). The column and carousel compartments are operated at 140° C. Three Polymer Laboratories, 10-µm Mixed-B columns are used with a solvent of 1,2,4-trichlorobenzene. The samples are prepared at a concentration of 0.1 g of polymer in 50 mL of solvent or 16 mg of polymer in 8 mL of solvent. The solvent used to prepare the samples contain 200 ppm of BHT. Samples are prepared by agitating lightly for four hours, at 160° C. The injection volume used is 100 microliters, and the flow rate is 1.0 mL/min. Calibration of the GPC column set is performed with twenty one narrow molecular weight distribution polystyrene standards purchased from Polymer Laboratories. The molecular weight (MW) of the standards ranges from 580 to 8,400,000 g/mol, and the standards are contained in six cocktail mixtures. Each standard mixture has at least a decade of separation between individual molecular weights. The standards are purchased from Polymer Laboratories (Shropshire, UK). The polystyrene standards are prepared at 0.001 g in 20 mL of solvent for molecular weights equal to, or greater than, 1,000,000 g/mol, and at 0.005 g in 20 mL of solvent for molecular weights less than 1,000,000 g/mol.

The polystyrene standard peak molecular weights are converted to polyethylene molecular weights using the following Equation 1:

$$Mpolyethylene = A(Mpolystyrene)^B \quad (Eq. 1),$$

where M is the molecular weight, A has a value of 0.4316 and B is equal to 1.0 (T. Williams and I. M. Ward, *Polym. Letters*, 6, 621-624 (1968)). A third order polynomial is determined to build the logarithmic molecular weight calibration as a function of elution volume. Polyethylene equivalent molecular weight calculations are performed using VISCOTEK TriSEC software Version 3.0 for Agilent GPC instrument or GPCOne software for PolymerChar GPC instrument.

TABLE 2

|  | Density | Melt Index ($I_2$) | Vinyl unsaturation (per 1,000 total C atoms) | Molecular weight distribution ($M_w/M_n$) | Zero shear viscosity ratio |
|---|---|---|---|---|---|
| Example 1 | 0.9134 g/cm³ | 5.30 g/10 minutes | 0.031 | 2.06 | 1.96 |
| Example 2 | 0.9172 g/cm³ | 3.12 g/10 minutes | 0.047 | 2.79 | 2.03 |
| Example 3 | 0.9170 g/cm³ | 5.91 g/10 minutes | 0.044 | 4.34 | 1.69 |
| Comparative Example A | 0.9126 g/cm³ | 3.60 g/10 minutes | 0.049 | 2.03 | 2.42 |
| Comparative Example B | 0.9173 g/cm³ | 3.88 g/10 minutes | 0.197 | 3.26 | 1.93 |

CEF Method

Comonomer distribution analysis is performed with Crystallization Elution Fractionation (CEF) (PolymerChar, Spain) (Monrabal et al, Macromol. Symp. 257, 71-79 (2007)) equipped with IR-4 detector or IR-5 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B1378-500G, batch number 098K0686) from Sigma-Aldrich are obtained. ODCB is distilled before use. Silica gel 40 (particle size 0.20.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. For the CEF instrument equipped with an autosampler with N2 purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This ODCB containing BHT and silica gel or ODCB dried with silica gel 40 is now referred to as "ODCB." This ODBC is sparged with dried nitrogen ($N_2$) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 µl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 µm±6% (MO-SCI Specialty Products) with ⅛ inch stainless tubing according to U.S. Pat. No. 8,372,931. The column outside diameter (OD) is ⅛ inch. The parameters to duplicate the method include the column internal diameter (ID), and column length (L). The choice of ID and L are such that when packed with the 125 µm diameter glass beads, the liquid internal volume is 2.1 to 2.3 mL. If L is 152 cm, then ID will be 0.206 cm and the wall thickness will be 0.056 cm. Different values for L and ID can be used, as long as the glass bead diameter is 125 µm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931. GPCOne software (PolymerChar, Spain) is used to process CEF chromatogram.

CDC Method

Comonomer distribution constant (CDC) was calculated from comonomer distribution profile by CEF. CDC is defined as Comonomer Distribution Index divided by Comonomer Distribution Shape Factor multiplying by 100 as shown in the following formula:

$$CDC = \frac{\text{Comonomer Distribution Index}}{\text{Comonomer Distribution Shape Factor}} = \frac{\text{Comonomer Distribution Index}}{\text{Half Width}/Stdev} * 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in the CDC formula above, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature ($T_p$).

CDC is calculated according to the following steps:

(A) Obtain a weight fraction at each temperature (T) (wT(T)) from 35.0° C. to 119.0° C. with a temperature step increase of 0.200° C. from CEF according to the following formula:

$$\int_{35}^{119.0} w_T(T)dT = 1$$

(B) Calculate the median temperature ($T_{median}$) at cumulative weight fraction of 0.500, according to the following formula:

$$\int_{35}^{T_{median}} w_T(T)dT = 0.5$$

(C) Calculate the corresponding median comonomer content in mole % ($C_{median}$) at the median temperature ($T_{median}$) by using comonomer content calibration curve according to the following formula:

$$\ln(1 - comonomercontent) = -\frac{207.26}{273.12 + T} + 0.5533$$

$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; the calibration is calculated from each reference material utilizing the Formula as shown in (C) above, wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;

(H) Calculate the standard deviation of temperature (Stdev) according to the following formula:

$$Stdev = \sqrt{\sum_{35.0}^{119.0} (T - T_p)^2 * w_T(T)}$$

Separation index was determined for Examples 1-3 and Comparative Examples A-B utilizing Crystallization Elution Fractionation (CEF) analysis. CEF curve with data collected from 35° C. to 120° C. in intervals of 0.2° C. was utilized, such that CEF temperatures are denoted as $x_0 \ldots x_{425}$, and the CEF signal magnitude at each $x_i$ was denoted as $f(x_i)$. Each point $x_{peak}$ was identified such:

$f(x_{peak}) - f(x_{peak-1}) \geq 0$ $f(x_{peak}) - f(x_{peak-2}) \geq 0$ $f(x_{peak}) - f(x_{peak-3}) \geq 0$ $f(x_{peak}) - f(x_{peak+1}) \geq 0$ $f(x_{peak}) - f(x_{peak+2}) \geq 0$ $f(x_{peak}) - f(x_{peak+3}) \geq 0$ Two values, $x_{peak1}$ and $x_{peak2}$, were taken as the $x_{peak}$ values with the largest f(x) values such that $x_{peak2} > x_{peak1}$. It is noted that if there was only one peak then the Separation Index $S_i = 0$ by definition and no further steps are performed.

From $x_o$ iteration was performed over $x_i$, and $x_{1b}$ was defined as the first $x_i$ such that $f(x_i) > f(x_{peak1})/3$.

From $x_{peak1}$ iteration was performed over $x_i$, and $x_{1f}$ was defined as the first $x_i$ such that $f(x_i) < f(x_{peak1})/3$.

From $x_{425}$ iteration was performed backwards over $x_i$, and $x_{2f}$ was defined as the first $x_i$ such that $f(x_i) > f(x_{peak2})/3$.

From $x_{peak2}$ iteration was performed backwards over $x_i$, and $x_{2b}$ was defined as the first $x_i$ such that $f(x_i) < f(x_{peak2})/3$.

Then, the Separation Index was determined by evaluating the following formula:

$$S_i = \frac{x_{peak2} - x_{peak1}}{x_{1f} - x_{1b} + x_{2f} - x_{2b}}$$

It is noted that by utilizing this definition, it may be observed for highly multimodal structures that the implied peak width of one may incorporate multiple peaks. It is also possible that for narrowly distributed peaks that $x_{2b} < x_{1f}$ or even $< x_{1b}$. In both of these cases the definition will reduce the $S_i$, which is desired because these designs represent excessively broad and excessively narrow SCBDs, respectively.

The Comonomer Distribution Constant and Separation Index for Examples 1-3 and Comparative Examples A-B are reported in Table 3.

TABLE 3

|  | Comonomer Distribution Constant | Separation Index |
|---|---|---|
| Example 1 | 273.4 | 1.01 |
| Example 2 | 168.2 | 1.03 |
| Example 3 | 290.0 | 0.84 |
| Comparative Example A | 60.3 | 0.23 |
| Comparative Example B | 78.5 | 0.35 |

Examples 4-9 and Comparative Examples C-F were cast films formed as follows: cast films were fabricated on an Egan-Davis coextrusion cast film line consisting of three Egan Davis-Standard mod. 350 extruders (2.5 in, 30:1 L/D) and two Egan-Davis Standard mod. DS-25 (2 in, 30:1 L/D) extruders. The line utilized a Cloeren 5-layer dual plane feedblock and a Cloeren 36" Epoch III AUTOGAUGE 5.1 coat hanger die with a 0.020 in die gap. Extruder barrel temperatures were adjusted based on the resin and pumping rates to maintain a constant melt temperature. Die zone temperatures corresponded to the polymer melt temperature, approximately 525° F. Line speeds were determined by maintaining output rate at 400 lb/hour while controlling film thickness (0.8 and 0.6 mil) using a Scantech LF1-1000 X-Ray sensor film measurement and control system. Both primary and secondary chill roll temperatures were held constant at 70° F. Air gap was maintained at approximately 3.5" for all samples. An air knife was used to pin the film to the chill roll.

Examples 4-6 and Comparative Examples C-D had 0.8 mil thicknesses and were formed respectively from Examples 1-3 and Comparative Examples A-B; Examples 7-9 and Comparative Examples E-F had 0.6 mil thicknesses and were formed respectively from Examples 1-3 and Comparative Examples A-B.

Ultimate stretch, on-pallet puncture, and on-pallet tear were determined for Examples 4-9 and Comparative Examples C-D.

Ultimate stretch was determined according to the Highlight Test Stand, commercially available from Highlight Industries. The test was performed as follows: The film roll was placed on the unwind section of the machine and the film was passed through a set of rollers. The film was then unwound with increasing force until it reached its ultimate stretch point. Load cells measured the amount of force applied and a calculation using the ratio of roller rotational speeds was made to determine the amount of stretch present in the film. The film width was 20 inches, and the film was unwound in such a way as to maintain a constant 180 ft/min film rate after stretching. Three or more tests (as specified) were conducted and averaged together to obtain the average ultimate stretch value.

On-pallet tear was determined utilizing a Lantech stretch wrapper. Respective 20-inch width films were wrapped on the stretch wrapper, which was set to 250% stretch. The cylindrical test pallet (diameter about 57 in) was wrapped at 10 rpm, with the film wrapping a constant portion of the test pallet, rather than moving up and down. The tests vary dancer bar "F2" setting, which can be changed in 0.5 lbf increments from 7 lbf to 18 lbf. For on-pallet tear, the test wrapped over a 3.5-inch long protrusion ending in a box cutter blade corner oriented in the machine direction, and only the blade portion of the protrusion interacts with the film. The pallet was continuously wrapped and with each wrap the F2 force was increased by 0.5 lbf until the film splits completely in the cross-machine direction within the timespan of one wrap (6 seconds). The highest F2 force where such a failure did not occur was reported as the on-pallet tear.

On-pallet puncture was determined utilizing a Lantech stretch wrapper. Respective 20-inch width films were wrapped on the stretch wrapper, which was set to 250% stretch. The rectangular pallet (approximately 35×44 in) was wrapped at 10 rpm, with the film wrapping a constant portion of the test pallet, rather than moving up and down. The tests vary dancer bar "F2" setting, which can be changed in 0.5 lbf increments from 7 lbf to 18 lbf. The pallet wraps over a 2"×2" steel protrusion extending from one corner of the pallet (parallel to the short sides of the rectangle) to a distance of 12". The probe was hollow and covered with masking tape for smoothness. Each trial consisted of wrapping the pallet three times and evaluating whether the probe punctured the film. For a given F2 force, the film is considered to have passed at that F2 force if the film was not punctured at least 3 out of 6 trials. The highest F2 force passed (determined through a staircase method using 0.5 lbf intervals) is reported as the on-pallet puncture result.

The ultimate stretch, on-pallet puncture, and on-pallet tear were determined for Examples 4-6 and Comparative Examples C-D and are reported in Table 4; ultimate stretch, on-pallet puncture, and on-pallet tear were determined for Examples 7-9 and Comparative Examples E-F and are reported in Table 5.

TABLE 4

|  | Ultimate Stretch (%, 9 test runs) | | On-Pallet Puncture (lbf, 3 test runs) | | On-Pallet Tear (lbf, 1 test runs) |
| --- | --- | --- | --- | --- | --- |
|  | Average | Standard deviation | Average | Standard deviation |  |
| Example 4 (0.8 mil thickness) | 355 | 4.6 | 14.8 | 0.29 | 11.5 |
| Example 5 (0.8 mil thickness) | 360 | 25.3 | 13.5 | 0.00 | 15.0 |
| Example 6 (0.8 mil thickness) | >400 | n/a | 9.2 | 0.29 | 15.5 |
| Comparative Example C (0.8 mil thickness) | 337 | 5.6 | 14.5 | 0.00 | 7.0 |
| Comparative Example D (0.8 mil thickness) | 340 | 25.1 | 12.3 | 0.29 | 13.0 |

TABLE 5

|  | Ultimate Stretch (%, 6 test runs) | | On-Pallet Puncture (lbf, 3 test runs) | | On-Pallet Tear (lbf, 1 test runs) |
| --- | --- | --- | --- | --- | --- |
|  | Average | Standard deviation | Average | Standard deviation |  |
| Example 7 (0.6 mil thickness) | 296 | 24.2 | 11.0 | 0.50 | 8.0 |
| Example 8 (0.6 mil thickness) | 303 | 2.8 | 10.0 | 0.00 | 11.0 |
| Example 9 (0.6 mil thickness) | 379 | 10.6 | 7.0 | 0.00 | 11.5 |
| Comparative Example E (0.6 mil thickness) | 292 | 12.3 | Could not wrap pallet reliably at 250% stretch | — | Could not wrap pallet reliably at 250% stretch |
| Comparative Example F (0.6 mil thickness) | 280 | 20.2 | 9.3 | 0.35 | 9.0 |

The data of Table 4 and 5 illustrates that Examples 4-9, which are formed from ethylene/alpha-olefin interpolymer compositions Examples 1-3 that each have an improved Separation Index as compared to Comparative Examples A-B, each advantageously have an improved, e.g., greater ultimate stretch value, as compared respectively to Comparative Examples C-D and Comparative Examples E-F. The improved ultimate stretch value can be an important processing parameter for a number of applications.

What is claimed:

1. An ethylene/ alpha-olefin interpolymer composition having a Comonomer Distribution Constant (CDC) in a range of from 200 to 400, a vinyl unsaturation of less than 0.15 vinyls per one thousand total carbon atoms present in the interpolymer composition, a zero shear viscosity ratio (ZSVR) in a range from 1.5 to 5, a density in a range of from 0.903 to 0.950 g/cm$^3$, a melt index ($I_2$) in a range of from 0.1 to 15 g/ 10 minutes, a molecular weight distribution (Mw/Mn) in a range of from 1.8 to 4.5, and a separation index of from 0.50 to 1.10.

2. The ethylene/alpha-olefin interpolymer composition of claim 1, wherein the composition has a density in a range of from 0.903-0.925.

3. The ethylene/alpha-olefin interpolymer composition of claim 1, wherein the composition has a melt index ($I_2$) in a range of from 0.1 to 10 g/ 10 minutes.

4. The ethylene/alpha-olefin interpolymer composition of claim 1, wherein the composition has a separation index of from 0.60 to 1.08.

5. The ethylene/alpha-olefin interpolymer composition of claim 1, wherein the composition has a separation index of from 0.60 to 1.05.

6. An article formed from the ethylene/alpha-olefin interpolymer composition of claim 1, wherein the article comprises a film and wherein the film has a thickness of 0.8 mil and an ultimate stretch value greater than 345%.

7. An article formed from the ethylene/alpha-olefin interpolymer composition of claim 1, wherein the article comprises a film and wherein the film has a thickness of 0.6 mil and an ultimate stretch value greater than 295%.

* * * * *